(12) United States Patent
Prebble (10) Patent No.: US 9,761,028 B2
(45) Date of Patent: Sep. 12, 2017

(54) GENERATION OF GRAPHICAL EFFECTS

(71) Applicant: Tim Prebble, Longmont, CO (US)

(72) Inventor: Tim Prebble, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 531 days.

(21) Appl. No.: 13/766,448

(22) Filed: Feb. 13, 2013

(65) Prior Publication Data

US 2014/0229822 A1 Aug. 14, 2014

(51) Int. Cl.
*G06F 17/21* (2006.01)
*G06T 11/60* (2006.01)

(52) U.S. Cl.
CPC .................. *G06T 11/60* (2013.01)

(58) Field of Classification Search
CPC .................. G06F 17/21; G06K 9/00
See application file for complete search history.

(56) References Cited

U.S. PATENT DOCUMENTS

| | | | | |
|---|---|---|---|---|
| 5,828,814 | A * | 10/1998 | Cyman et al. | 358/1.2 |
| 5,870,097 | A * | 2/1999 | Snyder et al. | 345/426 |
| 6,198,477 | B1 * | 3/2001 | Kurtze et al. | 715/201 |
| 6,313,847 | B1 * | 11/2001 | Carlsen | 345/629 |
| 6,904,176 | B1 * | 6/2005 | Chui et al. | 382/240 |
| 7,912,296 | B1 * | 3/2011 | Zelinka | G01C 21/00 345/626 |
| 8,289,318 | B1 * | 10/2012 | Hadap | G06T 17/20 345/419 |
| 8,379,021 | B1 * | 2/2013 | Miller et al. | 345/426 |
| 8,417,046 | B1 * | 4/2013 | McDougal | G06K 9/36 382/254 |
| 8,553,976 | B2 * | 10/2013 | Cherna et al. | 382/162 |
| 8,687,011 | B2 * | 4/2014 | Gong et al. | 345/587 |
| 2002/0159648 | A1 * | 10/2002 | Alderson et al. | 382/260 |
| 2004/0032409 | A1 * | 2/2004 | Girard | G06T 15/60 345/426 |
| 2005/0152002 | A1 * | 7/2005 | Shirakawa | H04N 1/3871 358/1.18 |

(Continued)

FOREIGN PATENT DOCUMENTS

CN 101483723 A * 1/2008 ............. H04N 5/278

OTHER PUBLICATIONS

Wikipedia, Downsampling, Apr. 15, 2010, pp. 1-2.*

(Continued)

*Primary Examiner* — Scott Baderman
*Assistant Examiner* — Sookil Lee
(74) *Attorney, Agent, or Firm* — Osha Liang LLP (57) ABSTRACT

A method for managing a page, involving: obtaining an electronic document having a main object and multiple parameters defining an effect for the main object; generating a display list for the page having multiple scaled-down graphical primitives corresponding to a scaled-down version of the main object; generating a scaled-down tile having the scaled-down version of the main object by rasterizing the multiple scaled-down graphical primitives; generating an effect tile comprising a scaled-down version of the effect by applying the multiple parameters to the scaled-down tile; rasterizing the effect tile into a framebuffer for the page by up-scaling the effect tile; and outputting the framebuffer for the page.

17 Claims, 4 Drawing Sheets

(56) References Cited

U.S. PATENT DOCUMENTS

| | | | | |
|---|---|---|---|---|
| 2005/0162435 | A1* | 7/2005 | Hashimoto et al. | 345/545 |
| 2005/0286794 | A1* | 12/2005 | Brunner et al. | 382/264 |
| 2006/0182149 | A1* | 8/2006 | Ramsdale | 370/516 |
| 2007/0118821 | A1* | 5/2007 | Yee et al. | 715/864 |
| 2007/0278320 | A1* | 12/2007 | Lunacek et al. | 236/94 |
| 2009/0003720 | A1* | 1/2009 | Sun | H04N 1/41 382/254 |
| 2009/0034868 | A1* | 2/2009 | Rempel | G09G 3/3426 382/264 |
| 2010/0014767 | A1* | 1/2010 | Morales | 382/254 |
| 2010/0194666 | A1* | 8/2010 | Lindner | G06F 3/1431 345/1.1 |
| 2010/0295851 | A1* | 11/2010 | Diamand | G06T 15/405 345/422 |
| 2010/0295853 | A1* | 11/2010 | Diamand | G06T 15/405 345/426 |
| 2011/0013203 | A1* | 1/2011 | Grosz | G06F 17/3028 358/1.2 |
| 2011/0075217 | A1* | 3/2011 | Prebble | 358/1.16 |
| 2011/0102438 | A1* | 5/2011 | Mathe | G06F 3/017 345/426 |
| 2011/0213795 | A1* | 9/2011 | Lee et al. | 707/769 |
| 2011/0243438 | A1* | 10/2011 | Hoppe | G06T 3/4007 382/167 |
| 2012/0206470 | A1* | 8/2012 | Frank | H04N 1/4078 345/581 |
| 2012/0240023 | A1* | 9/2012 | Ohguro | 715/221 |
| 2013/0007582 | A1* | 1/2013 | Prebble et al. | 715/211 |
| 2013/0028538 | A1* | 1/2013 | Simske | 382/300 |
| 2013/0091427 | A1* | 4/2013 | Anderson et al. | 715/267 |
| 2013/0308859 | A1* | 11/2013 | Kobayashi | G06T 5/001 382/167 |
| 2014/0096041 | A1* | 4/2014 | Gowen et al. | 715/753 |
| 2014/0195921 | A1* | 7/2014 | Grosz et al. | 715/738 |
| 2014/0210850 | A1* | 7/2014 | Bellert | 345/600 |

OTHER PUBLICATIONS

Michael W. Gray, Taking a byte out of bit depth—Jpeg vs. RAW, Apr. 5, 2010, pp. 1-13.*

Gowen, Michael Ryan, filed Sep. 28, 2012, U.S. Appl. No. 61/707,007, pp. 1-35.*

Marco Chiappetta, Nov. 6, 2012, http://www.pcworld.com/article/2013584/how-to-rename-and-resize-images-in-bulk-for-easy-organization.html (PCWorld.pdf), pp. 1-5.*

Obviousidea Youtube Channel, Mar. 18, 2011, https://youtu.be/siQzcF9h9TY (resizer.pdf), pp. 1-2.*

* cited by examiner

GENERATION OF GRAPHICAL EFFECTS

BACKGROUND

An electronic document (ED) may identify a main object (e.g., text, images, and/or graphics) and define a variety of graphical effects (e.g., outer shadows, reflections, etc.) to be applied to the main object. It is the responsibility of a Page Rendering Device (PRD) or user machine to place the main objects and their effects on a page as specified by the ED. As each effect may consume a large amount of memory, the memory resources of the PRD may be strained by the one or more effects. Regardless, users still like specifying effects to be applied to main objects in an ED written in a document markup language.

SUMMARY

In general, in one aspect, the invention relates to a method for managing a page. The method comprises: obtaining an electronic document comprising a main object and a first plurality of parameters defining a first effect for the main object; generating, by a computer processor (CP), a display list for the page comprising a plurality of scaled-down graphical primitives corresponding to a scaled-down version of the main object; generating, by the CP, a scaled-down tile comprising the scaled-down version of the main object by rasterizing the plurality of scaled-down graphical primitives; generating, by the CP, an effect tile comprising a scaled-down version of the first effect by applying the first plurality of parameters to the first tile; rasterizing, by the CP, the effect tile into a framebuffer for the page by up-scaling the effect tile; and outputting the framebuffer for the page.

In general, in one aspect, the invention relates to a non-transitory computer readable medium (CRM) storing instructions for managing a page. The instructions comprise functionality for: obtaining an electronic document comprising a main object and a first plurality of parameters defining a first effect for the main object; generating a display list for the page comprising a plurality of scaled-down graphical primitives corresponding to a scaled-down version of the main object; generating a scaled-down tile comprising the scaled-down version of the main object by rasterizing the plurality of scaled-down graphical primitives; generating an effect tile comprising a scaled-down version of the first effect by applying the first plurality of parameters to the first tile; rasterizing the effect tile into a framebuffer for the page by up-scaling the effect tile; and outputting the framebuffer for the page.

In general, in one aspect, the invention relates to a system for managing a page. The system comprises: a processor; a buffer storing an electronic document comprising a main object and a first plurality of parameters defining a first effect for the main object; a display list comprising a plurality of scaled-down graphical primitives corresponding to a scaled-down version of the main object; a framebuffer for the page; and a rasterization engine executing on the processor and configured to: generate a scaled-down tile comprising the scaled-down version of the main object by rasterizing the plurality of scaled-down graphical primitives; generate an effect tile comprising a scaled-down version of the first effect by applying the first plurality of parameters to the scaled-down tile; rasterize the effect tile into the framebuffer by up-scaling the effect tile.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing a page of an ED including a main object and multiple parameters defining one or more effects for the main object. Specifically, a display list including scaled-down graphical primitives for a scaled-down version of the main object is generated. A scaled-down tile including the scaled-down version of the main object is generated by rasterizing these scaled-down graphical primitives. The scaled-down tile has a smaller geometry, a lower resolution, and/or a lower bit depth compared to a tile having a full-sized version of the main object. Accordingly, the scaled-down tile consumes fewer resources (e.g., memory) compared to a tile having a full-sized version of the main object.

An effect tile is generated by applying one or more of the plurality of parameters to the scaled-down tile. The effect tile is rasterized into a framebuffer for the page by up-scaling the effect tile. Depending on the effect(s), one or more of the parameters may be applied to the scaled-down tile, and the scaled-down tile itself may also be rasterized into the framebuffer.

Figure 1:
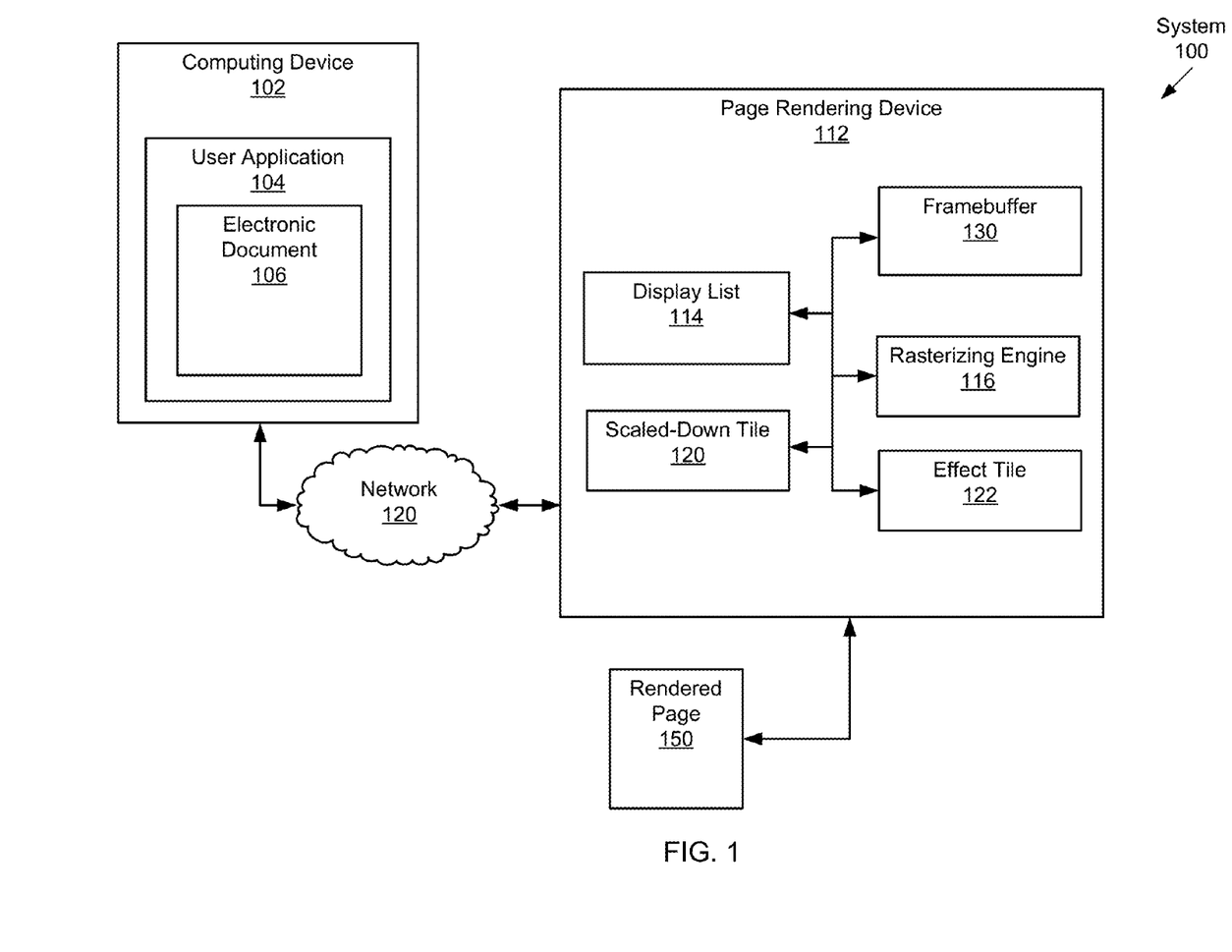
FIG. 1 shows a system in accordance with one or more embodiments of the invention.

FIG. 1 shows a system (100) in accordance with one or more embodiments of the invention. As shown in FIG. 1, the system (100) has multiple components including a page rendering device (PRD) (112) and a computing device (102). The PRD (112) may be a multifunction or regular printer, an electronic reader, etc. The computing device (102) may be a personal computer (PC), a desktop computer, a mainframe, a server, a telephone, a kiosk, a cable box, a personal digital assistant (PDA), an electronic reader, a tablet computer, a mobile phone, a smart phone, etc. There may be a direct connection (e.g., universal serial bus (USB) connection) between the computing device (102) and the PRD (112). Alternatively, the computing device (102) and the PRD (112) may be connected using a network (120) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)) having any number of pages. Accordingly, the user application (104) may be a word-processing application, a spreadsheet application, a desktop publishing application, a graphics application, a photograph printing application, an Internet browser, etc. The user application (104) may generate new EDs and/or obtain previously saved EDs.

In one or more embodiments of the invention, the ED (106) includes a main object. The main object may correspond to any combination of text, images, and graphics to be displayed or printed on a page. Further, the ED (106) may specify one or more main object transformation parameters (i.e., rotation, scaling, skewing, translation, etc.) to be applied to the main object. Further still, the ED (106) may also specify one or more effects (e.g., outer shadow, inner shadow, reflections, glow, softedge effect, etc.) to be applied to the main object.

In one or more embodiments of the invention, each effect is defined by one or more parameters. For example, the outer shadow effect is defined by multiple shadow parameters (e.g., color, transparency, blurring, skewing, scaling, shadow alignment, shadow direction, shadow offset distance, rotation, etc.). Similarly, the reflection(s) are defined by multiple reflection parameters (e.g., reflection offset distance, blurring, skewing, scaling, rotation, starting and ending alpha values for alpha gradient ramps, etc.).

In one or more embodiments of the invention, the ED (106) is represented/defined using a document markup language (e.g., ODF, OOXML, etc.). Accordingly, the main object, the main object transformation(s), and the parameters for the effects may be recorded as attributes within the tags of the document markup language. Moreover, these parameters are needed to correctly render the ED (106) for display or printing.

In one or more embodiments of the invention, the PRD (112) includes a display list (114). The display list (114) corresponds to a series of instructions to be processed (i.e., executed, interpreted) in order to generate tiles (discussed below) and the rendered page (150) of the ED (106). The display list (114) may include full-sized graphical primitives corresponding to a full-sized version of the main object (e.g., the size of the main object specified in the ED (106)). In other words, rasterizing the full-sized graphical primitives produces the full-sized main object. The display list (114) may also include scaled-down graphical primitives corresponding to a scaled-down version of the main object. In other words, rasterizing the scaled-down graphical primitives produces the scaled-down main object. The PRD (112) may include a buffer (not shown) to store the ED (106) while the display list (114) is being generated.

In one or more embodiments of the invention, depending on the effect(s) specified in the ED (106), the display list (114) has the scaled-down graphical primitives but not the full-sized graphical primitives. For example, in the case of an inner shadow, a glow, or a softedge effect, the display list (114) only has the scaled-down graphical primitives for the main object. However, in the case of outer shadows and reflections, the display list (114) may have both the scaled-down graphical primitives and the full-sized graphical primitives for the main object.

In one or more embodiments of the invention, the PRD (112) includes the effect tile (122). The effect tile (122) is a rectangular pixel buffer having a scaled-down version of certain types of effects (e.g., reflection, outer shadow, etc.) for the main object. The effect tile (122) has a smaller geometry, a lower resolution, and/or a lower bit depth compared to a tile having a full-sized version of the effect. Accordingly, the effect tile (122) consumes fewer resources (e.g., memory) compared to a tile having the full-sized version of the effect. Those skilled in the art, having the benefit of this detailed description, will appreciate that there may be multiple effect tiles depending on the number of effects for the main object specified in the ED (106).

In one or more embodiments of the invention, the PRD (112) includes the scaled-down tile (120). The scaled-down tile (120) is a rectangular pixel buffer having the scaled-down version of the main object. The scaled-down tile (120) has a smaller geometry, a lower resolution, and/or a lower bit depth compared to a tile having a full-sized version of the main object. For example, the scaled-down version may be half the length and one quarter the width of the full-sized version of the main object. As another example, the scaled-down version may be half the length and half the width (i.e., uniform scale factor) of the full-sized version of the main object. Accordingly, the scaled-down tile (120) consumes fewer resources (e.g., memory) compared to a tile having the full-sized version of the main object.

In one or more embodiments of the invention, the scaled-down tile (120) is transformed to generate certain types of effects (e.g., inner shadow, glow, softedge effect, etc.). Specifically, one or more parameters defining these specific effects may be applied to the scaled-down tile (120). Following application of the parameters to the scaled-down tile (120) (and thus the scaled-down version of the main object), the scaled-down tile (120) effectively has a scaled-down version of the effect(s). Accordingly, the scaled-down tile (120) may also be considered an effect tile.

In one or more embodiments of the invention, the PRD (112) includes a framebuffer (130). The framebuffer (130) is configured to store the full-sized effects (e.g., outer shadows, reflections, inner shadow, glow, softedge effect, etc.) once they are rendered. The framebuffer (130) is also configured to store the full-sized main object once it is rendered. The framebuffer (130) corresponds to a page and is outputted to display and/or print the page.

In one or more embodiments of the invention, the PRD (112) includes a rasterizing engine (116). The rasterizing engine (116) is configured to generate the scaled-down tile (120) by rasterizing the plurality of scaled-down graphical primitives in the display list (114). The rasterizing engine (116) is also configured to generate the effect tile (122) by applying one or more parameters defining certain types of effects (e.g., outer shadows, reflections, etc.) to the scaled-down tile (120) (i.e., the scaled-down tile (120) is an input to the process that generates the effect tile (122)). The rasterizing engine (116) is also configured to apply one or more parameters defining certain types of effects (e.g., inner shadow, glow, softedge effect, etc.) directly to the scaled-down tile (120) and its scaled-down version of the main object. As discussed above, following application of these parameters to the scaled-down tile (120), the scaled-down tile (120) effectively includes a scaled-down version of the effect(s).

In one or more embodiments of the invention, the rasterizing engine (116) is configured to rasterize the effect tile (122) into the framebuffer (130) for the page by up-scaling the effect tile (122). In other words, the rasterizing engine (116) is configured to apply a full-sized version of the effect (e.g., outer shadow, reflection, etc.) to the framebuffer (130) by up-scaling (e.g., via a transformation matrix) the effect tile (122) having the scaled-down version of the effect. The up-scaling is essentially the inverse operation to the down-scaling operation that created the scaled-down graphical primitives and the scaled-down version of the main object.

In one or more embodiments of the invention, the rasterizing engine (116) is configured to rasterize the scaled-down tile (120) into the framebuffer (130), when the scaled-down tile (120) has a scaled-down effect (e g., inner shadow, glow, softedge effect, etc.). In other words, the rasterizing engine (116) is configured to apply a full-sized version of the effect to the framebuffer (130) by up-scaling (e.g., via a transformation matrix) the scaled-down tile (120) having the scaled-down version of the effect. The up-scaling is essentially the inverse operation to the down-scaling operation that created the scaled-down graphical primitives and the scaled-down version of the main object.

In one or more embodiments of the invention, the rasterizing engine (116) is configured to rasterize the full-size graphical primitives in the display list (114) directly into the framebuffer (130). This effectively inserts a full-sized version of the main object into the framebuffer (130).

Those skilled in the art, having the benefit of this detailed description, will appreciate that graphical degradation may result from the down-scaling operation and/or subsequent up-scaling operation. However, in the case of effects (e.g., shadows, reflections, etc.), the visual properties of the effects (e.g., blurring) may obscure the degradation from the individual(s) viewing the page. Accordingly, graphical degradation is permissible, or at least tolerated, with respect to effects. However, in the case of the main object, graphical degradation is less likely to be tolerated. By rasterizing the full-size graphical primitives directly into the framebuffer (130), the main object is not subjected to graphical degradation.

Figure 2:
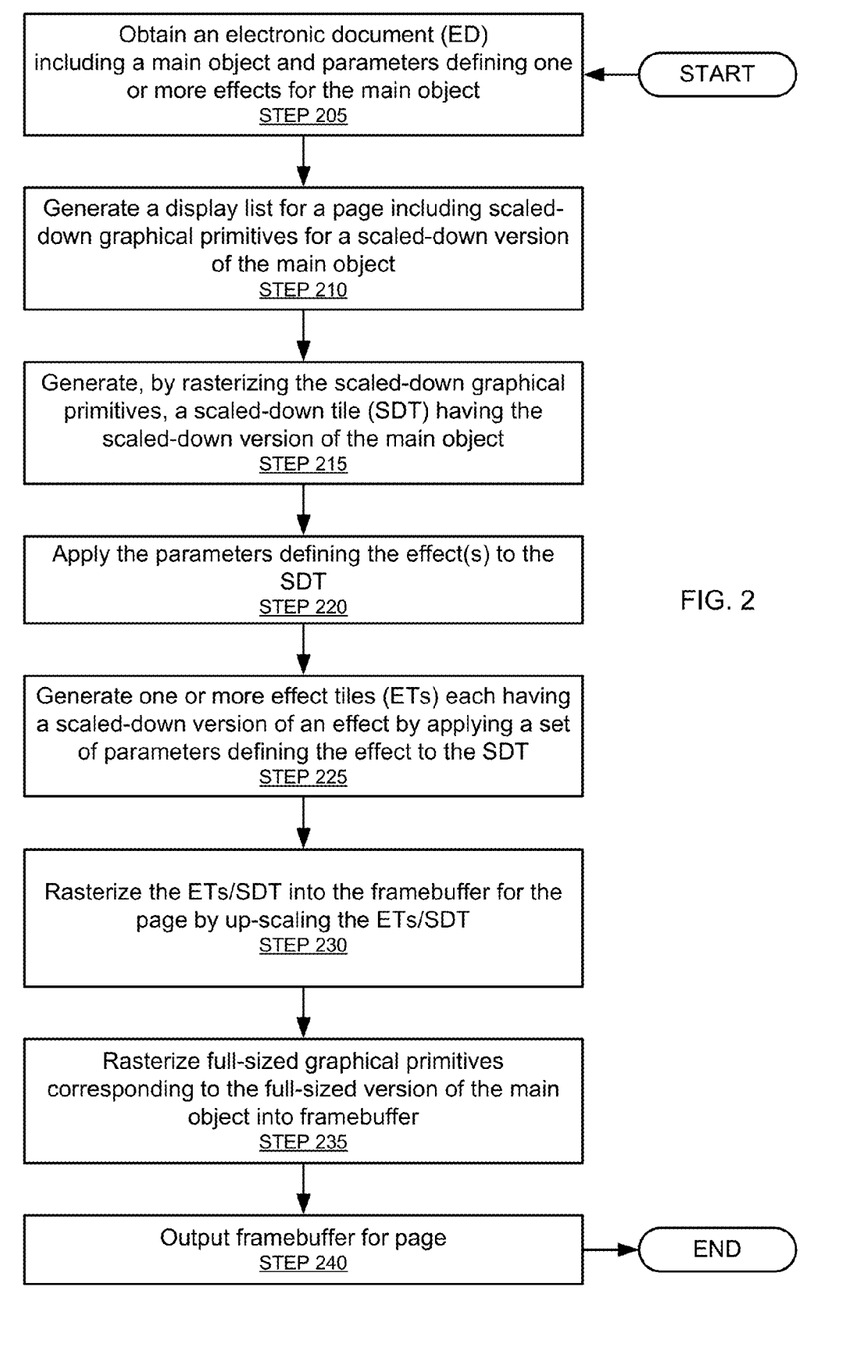
FIG. 2 shows a flowchart in accordance with one or more embodiments of the invention.

FIG. 2 shows a flowchart in accordance with one or more embodiments of the invention. The process shown in FIG. 2 may be executed, for example, by one or more components (e.g., rasterizing engine (116)) discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, an ED is obtained (STEP 205). The ED specifies at least one main object and multiple parameters defining one or more effects for the main object. The main object may correspond to any combination of text, images, and graphics to be displayed or printed on a page. Example effects include outer shadow, inner shadow, reflections, glow, softedge effect, etc. The ED may be represented/defined using a document markup language (e.g., ODF, OOXML, etc.) and the main object and the parameters for the effects may be recorded as attributes within the tags of the document markup language.

In STEP 210, a display list for a page of the ED is generated. The display list includes scaled-down graphical primitives corresponding to a scaled-down version of the main object. The display list may also include full-sized graphical primitives corresponding to a full-sized version of the main object. As discussed above, depending on the effect(s) specified in the ED, the display list might not have the full-sized graphical primitives.

In STEP 215, a scaled-down tile (SDT) is generated by rasterizing the scaled-down graphical primitives. The SDT is a rectangular pixel buffer having a scaled-down version of the main object. The SDT has a smaller geometry, a lower resolution, and/or a lower bit depth compared to a tile having a full-sized version of the main object. For example, the SDT may have one-third the length and one quarter the width compared to a tile having the full-sized version of the main object. As another example, the scaled-down version may be half the length and half the width (i.e., uniform scale factor) of the full-sized version of the main object. Accordingly, the SDT consumes fewer resources (e.g., memory) compared to a tile having a full-sized version of the main object.

As discussed above, some of the effects (e g., inner shadow, glow, softedge, etc.) are created by applying the parameters defining these effects directly to the SDT (STEP 220). The application of the parameters transforms the scaled-down version of the main object into the scaled-down version of the main object plus a scaled-down version of the effects. Accordingly, the SDT has a scaled-down version of the effect(s) following application of the parameters. In one or more embodiments of the invention, if an inner shadow, glow, and/or softedge are not to be applied to the main object, STEP 220 is omitted.

As also discussed above, some of the effects (e.g., reflections, outer shadows, etc.) are created by generating effect tiles. In STEP 225, the effect tiles are generated from the SDT (i.e., the SDT is an input to the process that generates each effect tile). Specifically, each effect tile is generated by applying one or more parameters defining the effect (e.g., outer shadow, reflection, etc.) to the SDT. The effect tile has a scaled-down version of the effect. The effect tile has a smaller geometry, a lower resolution, and/or a lower bit depth compared to a tile having a full-sized version of the effect. Accordingly, the effect tile consumes fewer resources (e.g., memory) compared to a tile having the full-sized version of the effect. In one or more embodiments of the invention, if outer shadows and reflections are not to be applied to the main object, STEP 225 is omitted.

Those skilled in the art, having the benefit of this detailed description, will appreciate that the order in which multiple effects are applied to a single main object is important to correctly render the main object and the effects for viewing and/or printing. In one or more embodiments of the invention, the effects are applied in the following order: softedge, glow, inner shadow, reflected outer shadow, reflected main object, and outer shadow. Other orders are possible. However, the SDT having both the scaled-down version of the main object and the scaled-down version of certain effects (e.g., softedge, glow, etc.) must be properly constructed before it can be used to generate the effect tiles having scaled-down versions of outer shadows and reflections.

In STEP 230, the effect tile(s) (from STEP 225), should they exist, are rasterized into a framebuffer for the page by up-scaling (i.e., via a transformation matrix) the effect tile(s). Rasterizing the effect tile(s) effectively applies a full-sized version of the effect to the framebuffer. Similarly, if an inner shadow, glow, and/or softedge has been applied to the main object, the SDT is also rasterizing into the framebuffer by up-scaling the SDT. The up-scaling is essentially the inverse operation to the down-scaling operation that created the scaled-down graphical primitives and the scaled-down version of the main object.

In STEP 235, the full-sized graphical primitives in the display list are rasterized directly into the frame buffer. This effectively inserts a full-sized version of the main object into the frame buffer. In one or more embodiments of the invention, STEP 235 is optional. For example, if an inner shadow, a glow, or a softedge is/are to be applied to the main object, the display list will not include full-scale graphical primitives (i.e., the full-scale graphical primitives will not even be generated), and STEP 235 is omitted.

In STEP 240, the framebuffer for the page is outputted in order that the page may be displayed and/or printed.

Those skilled in the art, having the benefit of this detailed description, will appreciate that graphical degradation may result from the down-scaling operation (e.g., STEP 215) and/or subsequent up-scaling operation (e.g., STEP 230). However, in the case of effects (e.g., shadows, reflections, etc.), the visual properties of the effects (e.g., blurring) may obscure the degradation from the individual(s) viewing the page. Accordingly, graphical degradation is permissible, or at least tolerated, with respect to effects. However, in the case of the main object, graphical degradation is less likely to be tolerated. By rasterizing the full-size graphical primitives directly into the framebuffer (STEP 235), the main object is not subjected to graphical degradation, even though the effect(s) might be.

Figure 3:
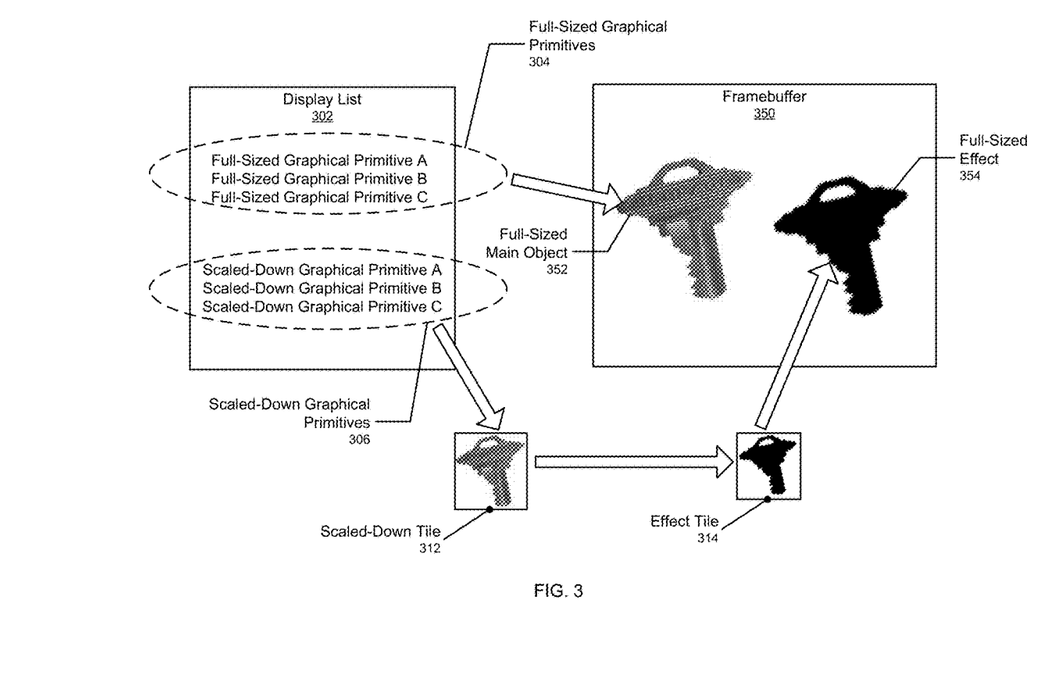
FIG. 3 shows an example in accordance with one or more embodiments of the invention.

FIG. 3 shows an example in accordance with one or more embodiments of the invention. Assume there exists an ED specifying an image of a house key as a main object, and specifying multiple parameters defining an outer shadow that is to be applied to the main object. As shown in FIG. 3, the display list (302) for the page includes both full-sized graphical primitives (304) corresponding to a full-sized version of the main object, and scaled-down graphical primitives (306) corresponding to a scaled-down version of the main object.

Still referring to FIG. 3, a scaled-down tile (312) is generated by rasterizing the scaled-down graphical primitives (306). The scaled-down tile (312) has a scaled-down version of the main object. The scaled-down tile (312) has a smaller geometry, a lower resolution, and/or a lower bit depth compared to a tile having a full-sized version of the main object. In this example, the scaled-down version may be half the length and half the width of the full-sized version of the main object. Accordingly, the scaled-down tile (312) is half the length and half the width compared to a tile having a full-sized version of the main object.

The effect tile (314) is generated by applying one or more of the parameters defining the outer shadow effect to the scaled-down tile (312). In other words, the scaled-down tile (312) is an input to the process that creates the effect tile (314). As shown in FIG. 3, the effect tile (314) has a scaled-down version of the shadow effect.

The effect tile (314) is rasterized into the framebuffer (350) by up-scaling the effect tile (314). This effectively applies a full-sized effect (354) (i.e., outer shadow) to the framebuffer (350). Moreover, the full-sized graphical primitives (304) are rasterized directly into the framebuffer (350). This effectively applies a full-size version of the main object (352) to the framebuffer (350).

As an alternate example, assume there exists an ED specifying the same main object (i.e., the image of the house key), but instead of specifying an outer showdown effect, the ED specifies only an inner shadow effect to be applied to the main object. In such a scenario, the full-sized graphical primitives (304) may be omitted. Similarly, the effect tile (314) may also be omitted and thus, the full-sized effect (354) is also omitted. The parameters defining the inner shadow effect are applied to the scaled-down tile (312) itself. Following application of the inner shadow parameters, the scaled-down tile (312) includes a scaled-down version of the effect. The scaled-down tile (312) may be rasterized into the framebuffer (350) by up-scaling the scaled-down tile (312). This effectively applies a full-sized version of the main object, with its inner shadow, to the frame buffer (350).

Embodiments of the invention may have one or more of the following advantages: the ability to generate effects for main objects; the ability to reduce memory consumption by graphically degrading some effects while not graphically degrading the main object itself; the ability to utilize scaled-down tiles to generate effects, etc.

Figure 4:
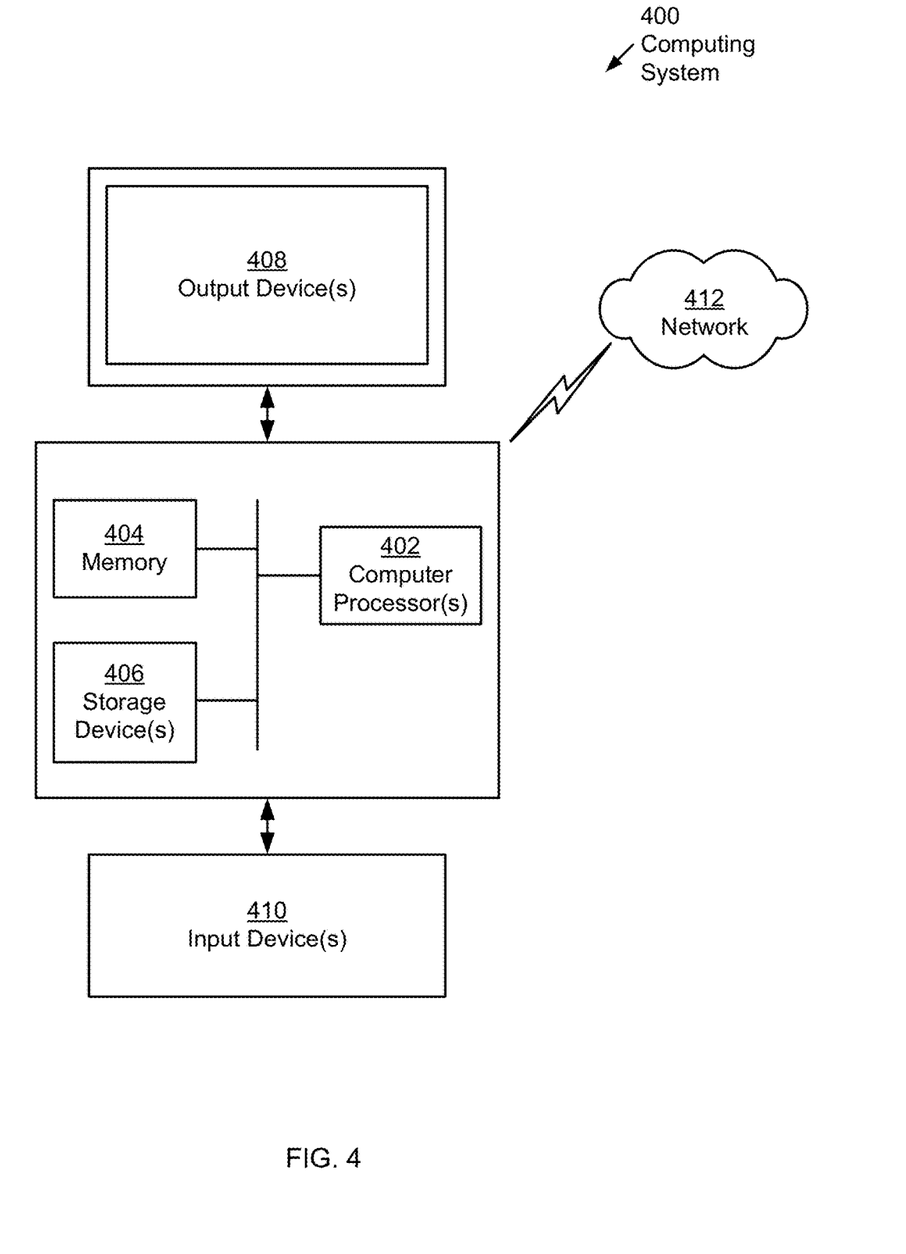
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a page, comprising:
    obtaining an electronic document (ED) comprising a markup comprising tags specifying:
        a main object for placement on the page;
        a first effect for the main object for placement on the page of the ED but separate from the main object, wherein the first effect comprises an outer shadow of the main object; and
        a first plurality of parameters defining the first effect for the main object;
    generating by a computer processor (CP) and in response to the tags of the ED specifying the first effect:
        a plurality of full-sized graphical primitives corresponding to a full-sized version of the main object, wherein rasterizing the plurality of full-sized graphical primitives produces the full-sized version of the main object; and
        a plurality of scaled-down graphical primitives corresponding to a scaled-down version of the main object, wherein rasterizing the plurality of scaled-down graphical primitives produces the scaled-down version of the main object;
    adding, by the CP, the plurality of full-sized graphical primitives and the plurality of scaled-down graphical primitives to a display list;
    generating, by the CP, a scaled-down tile comprising the scaled-down version of the main object without the first effect by rasterizing the plurality of scaled-down graphical primitives in the display list, wherein the scaled-down tile is a pixel buffer;
    generating, by a process executing on the CP, an effect tile comprising a scaled-down version of the first effect, specified in the tags of the ED, by applying the first plurality of parameters, specified in the tags of the ED, to the scaled-down tile, wherein the effect tile is a pixel buffer, and wherein the scaled-down tile is an input to the process that generates the effect tile;
    generating, for a framebuffer for the page, a full-sized version of the main object by rasterizing the plurality of full-size graphical primitives in the display list;
    generating, for the framebuffer for the page, the first effect specified in the tags by up-scaling the effect tile comprising the scaled-down version of the first effect, wherein the framebuffer is external to the scaled-down tile and the effect tile, and wherein the main object and the up-scaled effect tile are in the same framebuffer; and
    outputting the framebuffer for the page, the framebuffer comprising:
        the full-sized version of the main object for placement on the page of the ED; and
        the first effect for placement on the page of the ED but separate from the full-sized version of the main object.

2. The method of claim 1, further comprising:
    generating a scaled-down version of a second effect for the main object by applying a second plurality of parameters defining the second effect to the scaled-down tile; and
    rasterizing, after applying the second plurality of parameters, the scaled-down tile into the framebuffer for the page by up-scaling the scaled-down tile,
    wherein the ED further comprises the second plurality of parameters defining the second effect.

3. The method of claim 2, wherein the first effect is the outer shadow, and wherein the first plurality of shadow parameters comprises at least one selected from a group consisting of: shadow alignment, shadow direction, shadow offset distance, color, and transparency.

4. The method of claim 3, wherein the second effect is at least one selected from a group consisting of an inner shadow, a glow, and a softedge.

5. The method of claim 1, wherein the ED is described in OOXML, and wherein outputting the framebuffer comprises printing the page.

6. The method of claim 1, wherein the scaled-down tile comprising the scaled-down version of the main object has a lower resolution compared to a tile comprising a full-size version of the main object.

7. The method of claim 1, wherein the scaled-down tile comprising the scaled-down version of the main object has a lower bit depth compared to a tile comprising a full-sized version of the main object.

8. A non-transitory computer readable medium (CRM) storing instructions for managing a page, the instructions comprising functionality for:
    obtaining an electronic document (ED) comprising a markup comprising tags specifying:
        a main object for placement on the page;
        a first effect for the main object for placement on the page but separate from the main object, wherein the first effect comprises an outer shadow of the main object; and
        a first plurality of parameters defining the first effect for the main object;
    generating in response to the tags of the ED specifying the first effect:
        a plurality of full-sized graphical primitives corresponding to a full-sized version of the main object, wherein rasterizing the plurality of full-sized graphical primitives produces the full-sized version of the main object; and
        a plurality of scaled-down graphical primitives corresponding to a scaled-down version of the main object, wherein rasterizing the plurality of scaled-down graphical primitives produces the scaled-down version of the main object;
    adding the plurality of full-sized graphical primitives and the plurality of scaled-down graphical primitives to a display list;
    generating a scaled-down tile comprising the scaled-down version of the main object without the first effect by rasterizing the plurality of scaled-down graphical primitives in the display list, wherein the scaled-down tile is a pixel buffer;
    generating, by a process, an effect tile comprising a scaled-down version of the first effect, specified in the tags of the ED, by applying the first plurality of parameters, specified in the tags of the ED, to the scaled-down tile, wherein the effect tile is a pixel buffer, and wherein the scaled-down tile is an input to the process the generates the effect tile;

generating, for a framebuffer for the page, a full-sized version of the main object by rasterizing the plurality of full-size graphical primitives in the display list;

generating, for the framebuffer for the page, the first effect specified in the tags by up-scaling the effect tile comprising the scaled-down version of the first effect, wherein the framebuffer is external to the scaled-down tile and the effect tile, and wherein the main object and the up-scaled effect tile are in the same framebuffer; and outputting the framebuffer for the page, the framebuffer comprising:
  the full-sized version of the main object for placement on the page of the ED; and
  the first effect for placement on the page but separate from the full-sized version of the main object.

9. The non-transitory CRM of claim 8, the instructions further comprising functionality for:
  generating a scaled-down version of a second effect for the main object by applying a second plurality of parameters defining the second effect to the scaled-down tile; and
  rasterizing, after applying the second plurality of parameters, the scaled-down tile into the framebuffer for the page by up-scaling the scaled-down tile,
  wherein the ED further comprises the second plurality of parameters defining the second effect.

10. The non-transitory CRM of claim 9, wherein the first effect is the outer shadow, and wherein the second effect is at least one selected from a group consisting of an inner shadow, a glow, and a softedge.

11. The non-transitory CRM of claim 8, wherein the scaled-down tile comprising the scaled-down version of the main object has a lower resolution compared to a tile comprising a full-sized version of the main object.

12. The non-transitory CRM of claim 8, wherein the scaled-down tile comprising the scaled-down version of the main object has a lower bit depth compared to a tile comprising a full-sized version of the main object.

13. A system for managing a page, comprising:
  a buffer storing an electronic document (ED) comprising a markup comprising tags specifying:
    a main object for placement on the page of the ED;
    a first effect for the main object for placement on the page of the ED but separate from the main object, wherein the first effect comprises an outer shadow of the main object; and
    a first plurality of parameters defining a first effect for the main object;
  a processor coupled to the buffer that:
    generates, in response to the tags of the ED specifying the first effect, a plurality of full-sized graphical primitives corresponding to a full-sized version of the main object, wherein rasterizing the plurality of full-sized graphical primitives produces the full-sized version of the main object; and
    generates, in response to the tags of the ED specifying the first effect, a plurality of scaled-down graphical primitives corresponding to a scaled-down version of the main object, wherein rasterizing the plurality of scaled-down graphical primitives produces the scaled-down version of the main object;
    adds the plurality of full-sized graphical primitives and the plurality of scaled-down graphical primitives to a display list;
    generates a scaled-down tile comprising the scaled-down version of the main object without the first effect by rasterizing the plurality of scaled-down graphical primitives in the display list, wherein the scaled-down tile is a pixel buffer;
    generates, by a process, an effect tile comprising a scaled-down version of the first effect, specified in the tags of the ED, by applying the first plurality of parameters, specified in the tags of the ED, to the scaled-down tile, wherein the effect tile is a pixel buffer, and wherein the scaled-down tile is an input to the process that generates the effect tile;
    generates, for a framebuffer for the page, a full-sized version of the main object by rasterizing the plurality of full-size graphical primitives in the display list;
    generates, for the framebuffer for the page, the first effect specified in the tags by up-scaling the effect tile comprising the scaled-down version of the first effect,
    wherein the framebuffer is external to the scaled-down tile and the effect tile, and
    wherein the main object and the up-scaled effect tile are in the same framebuffer,
    wherein the framebuffer is outputted and comprises:
      the full-sized version of the main object for placement on the page of the ED; and
      the first effect for placement on the page but separate from the full-sized version of the main object.

14. The system of claim 13, wherein the processor also:
  generates a scaled-down version of a second effect for the main object by applying a second plurality of parameters defining the second effect to the scaled-down tile; and
  rasterizes, after applying the second plurality of parameters, the scaled-down tile into the framebuffer for the page by up-scaling the scaled-down tile,
  wherein the ED further comprises the second plurality of parameters defining the second effect.

15. The system of claim 14, wherein the first effect is the outer shadow, and wherein the second effect is at least one selected from a group consisting of an inner shadow, a glow, and a softedge.

16. The system of claim 13, wherein the scaled-down tile comprising the scaled-down version of the main object has a lower resolution compared to a tile comprising a full-sized version of the main object.

17. The system of claim 13, wherein the scaled-down tile comprising the scaled-down version of the main object has a lower bit depth compared to a tile comprising a full-sized version of the main object.

* * * * *